US012085012B1

(12) United States Patent
Barkey et al.

(10) Patent No.: US 12,085,012 B1
(45) Date of Patent: Sep. 10, 2024

(54) CLOSED LOOP FUEL CONTROL WITH A COLD LIGHT OFF CATALYST DUAL PATH SYSTEM

(71) Applicant: FCA US LLC, Auburn Hills, MI (US)

(72) Inventors: Michael Barkey, Maidstone (CA); Filip Vucak, Windsor (CA); Jeongyong Choi, Rochester, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/526,025

(22) Filed: Dec. 1, 2023

(51) Int. Cl.
*F02B 37/18* (2006.01)
*F02D 41/00* (2006.01)

(52) U.S. Cl.
CPC ........ *F02B 37/183* (2013.01); *F02D 41/0007* (2013.01); *F05D 2220/40* (2013.01)

(58) Field of Classification Search
CPC .... F02B 37/18; F02B 37/183; F02D 41/0007; F02D 2220/40; F02D 2013/0292; F02D 41/064; B60Y 2300/474; F01N 2410/06; F01N 3/2006; F01N 3/031; F01N 13/009
USPC .......................................................... 60/602
See application file for complete search history.

(56) References Cited

U.S. PATENT DOCUMENTS

| | | | | |
|---|---|---|---|---|
| 4,404,804 | A * | 9/1983 | Tadokoro | F01N 3/22 60/284 |
| 9,957,867 | B2 * | 5/2018 | Zhang | F01N 3/101 |
| 11,073,062 | B2 * | 7/2021 | Zhang | F01N 13/0093 |
| 2009/0094978 | A1 * | 4/2009 | Yamagata | F02D 9/04 60/602 |
| 2011/0011082 | A1 * | 1/2011 | Mehta | F02B 37/18 60/299 |
| 2018/0023450 | A1 * | 1/2018 | Zhang | F01N 3/023 60/602 |
| 2018/0058287 | A1 * | 3/2018 | Zhang | F01N 3/2006 |
| 2018/0266292 | A1 * | 9/2018 | Snow | F01N 3/106 |
| 2018/0355824 | A1 * | 12/2018 | Springer | F02M 26/22 |

* cited by examiner

*Primary Examiner* — J. Todd Newton
(74) *Attorney, Agent, or Firm* — Jeremy J. Klobucar

(57) ABSTRACT

A control system for an engine comprising a turbocharger includes a cold light off catalyst (CLOC), a main catalyst, a CLOC valve, a first and second oxygen sensor, and a controller. The CLOC is positioned in a bypass passage around a turbine of the turbocharger. The CLOC valve selectively routes exhaust flow from the engine between the turbine and the CLOC. The first oxygen sensor is disposed between the CLOC valve and the CLOC. The second oxygen sensor is disposed between the CLOC and the main catalyst. A position of the CLOC valve is determined and a priority is assigned to one of the first and second signals of the oxygen sensors based on the position of the CLOC valve. An engine out lambda is determined based on the first and second signals and assigned priority. An engine parameter is commanded.

14 Claims, 2 Drawing Sheets

CLOSED LOOP FUEL CONTROL WITH A COLD LIGHT OFF CATALYST DUAL PATH SYSTEM

FIELD

The present application generally relates to emissions control and, more particularly, to techniques for determining and controlling an optimal air-fuel ratio for an engine system that includes a cold light off catalyst.

BACKGROUND

As is known, pollutant emissions such as nitrogen oxides (NOx), carbon monoxide (CO), and hydrocarbon (HC) are temperature sensitive in aftertreatment systems. Such emission conversion begins at high temperatures such as over 350 C depending on catalyst formulation. Typically at engine startup, idle exhaust temperatures are much below the high temperatures needed for optimal catalyst efficiencies. In particular, an amount of time is needed for the exhaust to heat up from the typical exhaust temperatures to the elevated temperatures that satisfy a desired efficiency target. Operation of the engine during this heating up time is inefficient for conversion of such pollutants. Accordingly, a need exists in the art to improve upon efficiencies of aftertreatment systems.

SUMMARY

According to one example aspect of the invention, a control system for an engine comprising a turbocharger includes a cold light off catalyst (CLOC), a main catalyst, a CLOC valve, a first oxygen sensor, a second oxygen sensor, and a controller. The CLOC is positioned in a bypass passage around a turbine of the turbocharger. The main catalyst is disposed downstream of the turbine and the CLOC. The CLOC valve selectively routes exhaust flow from the engine between the turbine and the CLOC. The first oxygen sensor is disposed between the CLOC valve and the CLOC. The second oxygen sensor is disposed between the CLOC and the main catalyst. The controller is configured to receive signals from the first and second oxygen sensors indicative of an oxygen content. A position of the CLOC valve is determined and a priority is assigned to one of the first and second signals based on the position of the CLOC valve. An engine out lambda is determined based on the first and second signals and assigned priority. An engine parameter is commanded based on the determined engine out lambda.

In some implementations, the second oxygen sensor is disposed downstream of the turbine.

In other implementations, the commanded engine parameter is a fuel amount delivered to the engine.

In additional implementations, assigning priority comprises determining that the CLOC valve is in a position indicative of full exhaust flow to the CLOC. Determining an engine out lambda comprises utilizing the signal solely from the first oxygen sensor.

In additional implementations, assigning priority comprises determining that the CLOC valve is in a position indicative of zero exhaust flow to the CLOC. Determining an engine out lambda comprises utilizing the signal solely from the second oxygen sensor.

In additional implementations, assigning priority comprises determining that the CLOC valve is in a position indicative of a blend of exhaust flow between both the CLOC and the turbocharger. Determining an engine out lambda comprises utilizing both the signals from the first and second oxygen sensor.

In examples, utilizing both the signals comprises using blended signals proportional to an amount of exhaust flow diverted toward the CLOC.

According to another example aspect of the invention, a method for controlling an engine comprising a turbocharger is provided. The method includes commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode. Signals are received from a first and a second oxygen sensor indicative of an oxygen content, wherein the first oxygen sensor is disposed between the CLOC valve and the CLOC and the second oxygen sensor is disposed between the CLOC and a main catalyst. A position of the CLOC valve is determined. Priority is assigned to one of the first and second signals based on the position of the CLOC valve. An engine out lambda is determined based on the first and second signals and the assigned priority. An engine parameter is commanded based on the determined engine out lambda.

In some implementations, the second oxygen sensor is disposed downstream of the turbine.

In other implementations, the commanded engine parameter is a fuel amount delivered to the engine.

In additional implementations, assigning priority comprises determining that the CLOC valve is in a position indicative of full exhaust flow to the CLOC. Determining an engine out lambda comprises utilizing the signal solely from the first oxygen sensor.

In additional implementations, assigning priority comprises determining that the CLOC valve is in a position indicative of zero exhaust flow to the CLOC. Determining an engine out lambda comprises utilizing the signal solely from the second oxygen sensor.

In additional implementations, assigning priority comprises determining that the CLOC valve is in a position indicative of a blend of exhaust flow between both the CLOC and the turbocharger. Determining an engine out lambda comprises utilizing both the signals from the first and second oxygen sensor.

In examples, utilizing both the signals comprises using blended signals proportional to an amount of exhaust flow diverted toward the CLOC.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

The present disclosure is directed toward emission control on turbocharged engines. As is known, an oxygen or lambda sensor, placed intermediate an engine exhaust manifold and the main catalyst measures an oxygen content. The measurement is used to adjust the fuel amount that is sent to the engine by optimizing the air and fuel mixture. An engine system according to the present disclosure includes a cold light off catalyst (CLOC) where a CLOC valve is controlled to divert exhaust gas from the turbine of the turbocharger and through a small catalyst (upstream of the main catalyst) in a CLOC mode. The CLOC can achieve high efficiency quickly to treat the exhaust gas, while a much larger downstream catalyst is warming up.

During full rerouting of the exhaust from the turbocharger and to the CLOC, the oxygen sensor may not be able to provide accurate measurements. The system and techniques of the instant disclosure incorporates a first oxygen sensor between the CLOC valve and the CLOC; and a second oxygen sensor between the CLOC and the main catalyst. The first oxygen sensor is not subject to pre-turbine temperatures at high load (boost). Further, the exhaust temperatures at the second oxygen sensor are significantly lower than pre-turbine temperatures at high load. The measurements of the first and second oxygen sensors are used to determine an optimal fuel amount to be sent to the engine based on a position of the CLOC valve.

Figure 1:
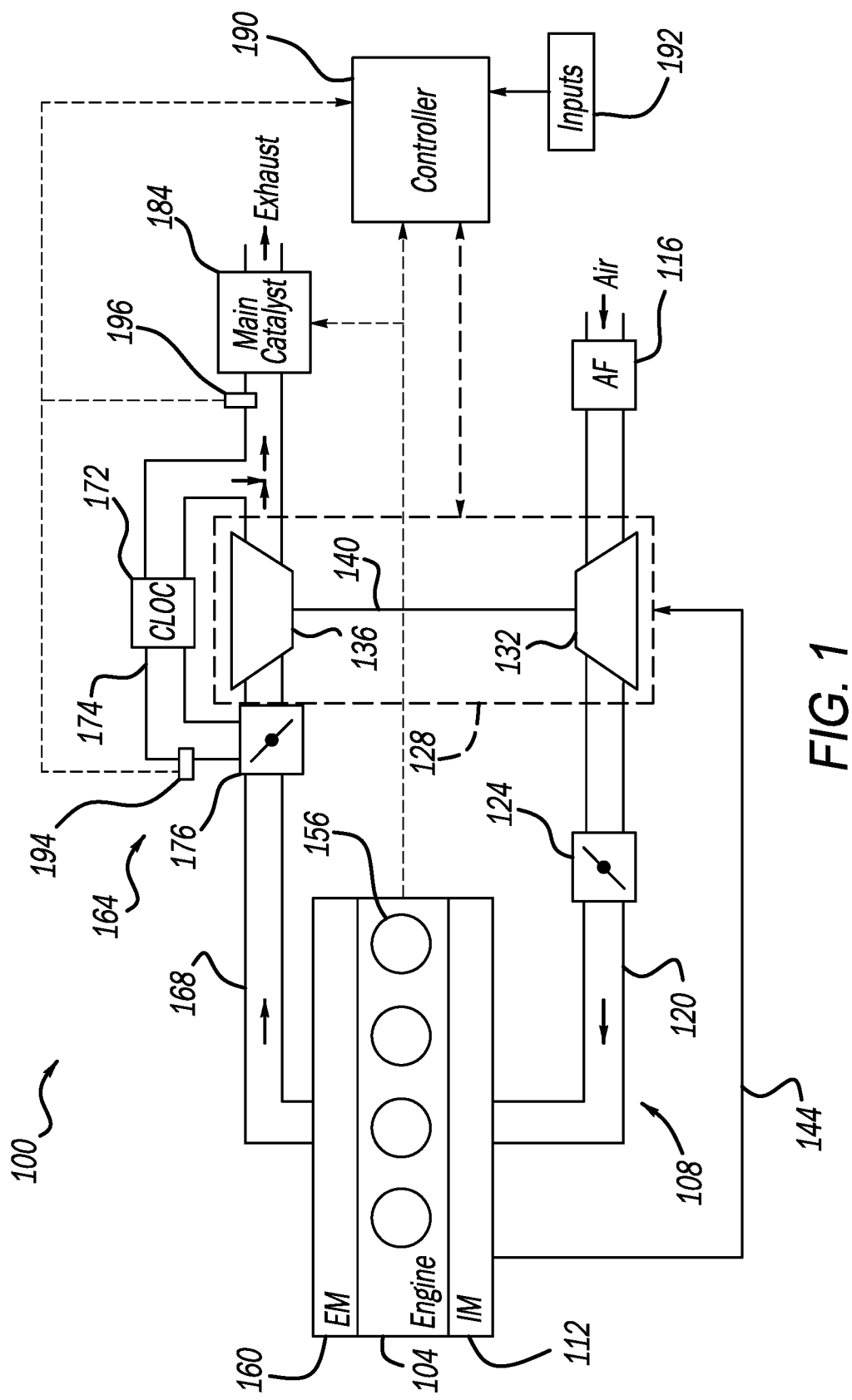
FIG. 1 is a diagram of an example vehicle comprising a turbocharged engine incorporating a cold light off catalyst (CLOC) and CLOC valve according to the principles of the present disclosure.
Figure 2:
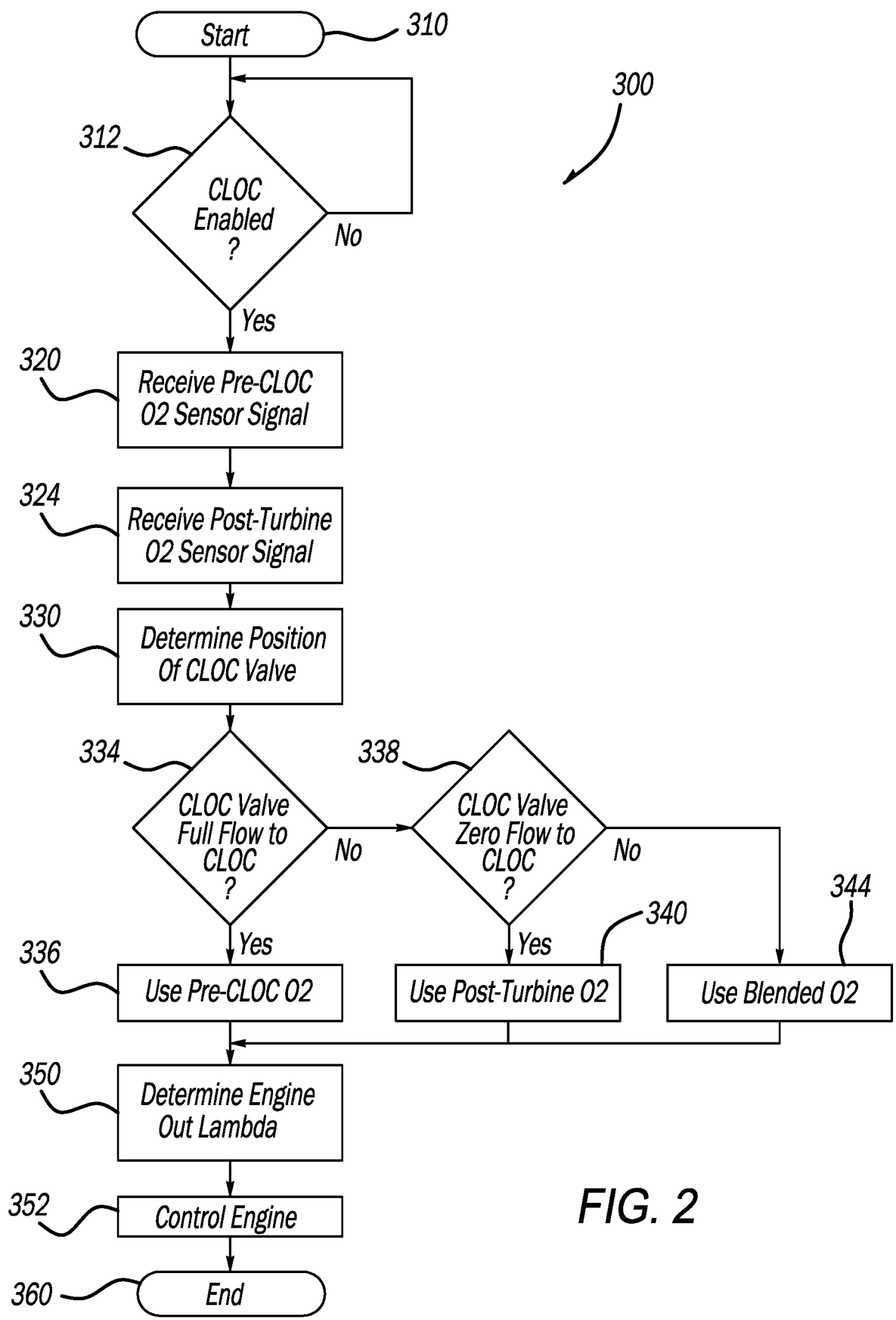
FIG. 2 is a flow diagram of an example method of determining an optimal air-fuel ratio for an engine system that includes a cold light off catalyst according to the principles of the present disclosure.

Referring now to FIG. 1, a diagram of an example vehicle or vehicle control system 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A cold light off catalyst (CLOC) 172 is routed in a bypass passage 174 around the turbine 136. A CLOC valve 176 selectively controls exhaust flow into the turbine 136 of the turbocharger 128 and/or into the CLOC 172 via the bypass passage 174. Explained further, the CLOC valve 176 moves between a fully open position whereby all exhaust gas is routed to the turbine 136, a fully closed position whereby all exhaust gas is routed to the CLOC 172, and infinite positions therebetween causing a blend of exhaust to be routed to both of the turbine 136 and the CLOC 172.

As used herein a "CLOC mode" is used to refer to a controller commanding the CLOC valve 176 to rout at least some exhaust to the CLOC 172. A main exhaust gas treatment system 184, such as a catalytic converter, treats exhaust gas to decrease or eliminate emissions before it is released into the atmosphere. All exhaust gas regardless of passing through the turbine 136 or the CLOC 172 is directed to the main exhaust gas treatment system 184. The CLOC 172 includes a small catalyst that can reach high efficiency quickly and treat the exhaust gas such as when the main catalyst 184 has yet to reach optimal operating temperature.

A controller, also referred to herein as an engine controller, 190 controls operation of the vehicle 100. Examples of components controlled by the controller 190 include the engine 104, the throttle valve 124, and the CLOC valve 176. It will be appreciated that the controller 190 controls specific components of the vehicle 100 that are not illustrated, such as, but not limited to, fuel injectors, spark plugs, an EGR valve, a VVC system (e.g., intake/exhaust valve lift/actuation), a transmission, and the like.

A first oxygen sensor 194 is incorporated between the CLOC valve 176 and the CLOC 172. A second oxygen sensor 196 between the CLOC 172 and the main catalyst 184. The first and second oxygen sensors 194 and 196 are located in less harmful locations as compared to closer to the exhaust manifold of the engine 104. The first oxygen sensor 176 is not subject to pre-turbine temperatures at high load (boost). Further, the exhaust temperatures at the second oxygen sensor 196 are significantly lower than pre-turbine temperatures at high load.

The measurements of the first and second oxygen sensors 194, 196 are communicated to the controller 190 and are used to determine an optimal fuel amount to be sent to the engine. As will be described in detail herein, the readings of the first and second oxygen sensors 194, 196 are used based on a position of the CLOC valve 176. In particular, if the CLOC valve 176 directs all exhaust flow to the CLOC 172, the first oxygen sensor 194 is used. If the CLOC valve 176 directs no exhaust flow to the CLOC 172, the second oxygen sensor 196 is used. If the CLOC valve 176 is in some intermediate position, a blended reading of both of the first and second oxygen sensors 194, 196 is used. In examples, the readings of the first and second oxygen sensors 194, 194 are blended proportionally with the flow amount directed in to the CLOC 172.

Lubrication oil from the engine 104 is routed through an oil line 144 to the turbocharger 128 to lubricate components of the turbocharger 128. In examples, the oil is sourced from the engine 104 at the sump.

The controller 190 controls operation of various components based on measured and/or modeled parameters. Inputs 192 such as one or more sensors are configured to measure one or more parameters, and communicate signals indicative thereof to the controller 190 (pressures, temperatures, speeds, etc.) as discussed in greater detail herein. Other parameters could be modeled by the controller 190, e.g., based on other measured parameters. The controller 190 is also configured to perform the engine/turbocharger control techniques.

Referring now to FIG. 3, a flow chart of an example method 300 of operating the engine 104 having the turbocharger 128, CLOC 172, CLOC valve 176, and first and second oxygen sensors 194, 196 is illustrated. For explanatory purposes, components of the vehicle 100 will be referenced, but it will be appreciated that this method 300 could be used for any engine having a turbocharger and CLOC. Control starts at 310. At 312, the controller 190 determines whether CLOC is enabled. Again, CLOC operation can be enabled such as at startup of the engine 104 when the main catalyst 184 has not reached optimal operating temperature. At 320 control receives a signal from the pre-CLOC (first) oxygen sensor 194 indicative of a first oxygen content. At 324 control receives a signal from the post-turbine (second) oxygen sensor 196 indicative of a second oxygen content.

At 330 control determines a position of the CLOC valve 176. The position of the CLOC valve 176 may be determined based on a position sensor that provides inputs 192. In other examples, the position of the CLOC 176 may be determined based on a position commanded by the controller 190. At 334, control determines whether the CLOC valve is moved to a position whereby full exhaust flow is routed to the CLOC 172. If yes, control uses the signal from the first oxygen sensor 194 at 336. If not, control determines whether the CLOC valve is moved to a position whereby no exhaust flow is routed to the CLOC 172 at 338. If yes, control uses the signal from the second oxygen sensor 196 at 340. If not, control uses a blended amount of the signals from the first and second oxygen sensors 194, 196. In other words, if the CLOC valve 176 is in some intermediate position, a blended reading of both of the first and second oxygen sensors 194, 196 is used in determining a fuel amount to be delivered to the engine 104 to reach a desired air-fuel mixture. Explained further, control assigns priority to at least one of the first and second oxygen sensors 194, 196 based on the position of the CLOC valve 176.

As identified above, the readings of the first and second oxygen sensors 194, 194 can be blended proportionally with the flow amount directed in to the CLOC 172. At 350 an engine out lambda is determined. At 352 the controller 190 controls the engine 104 (e.g., sends a fuel request) based on the signals of the first and second oxygen sensor and a position of the CLOC valve 176. Control ends at 360.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising a turbocharger, the system comprising:
a cold light off catalyst (CLOC) positioned in a bypass passage around a turbine of the turbocharger;
a main catalyst disposed downstream of the turbine and CLOC;
a CLOC valve that selectively routes exhaust flow from the engine between the turbine and the CLOC;
a first oxygen sensor disposed between the CLOC valve and the CLOC;
a second oxygen sensor disposed between the CLOC and the main catalyst;
a controller configured to:
receive signals from the first and second oxygen sensors indicative of an oxygen content;
determine a position of the CLOC valve;
assign priority to one of the first and second signals based on the position of the CLOC valve;
determine an engine out lambda based on the first and second signals and assigned priority; and
command an engine parameter based on the determined engine out lambda.

2. The control system of claim 1, wherein second oxygen sensor is disposed downstream of the turbine.

3. The control system of claim 1, wherein the commanded engine parameter is a fuel amount delivered to the engine.

4. The control system of claim 3, wherein assigning priority comprises:
determining that the CLOC valve is in a position indicative of full exhaust flow to the CLOC, and wherein determining an engine out lambda comprises;
utilizing the signal solely from the first oxygen sensor.

5. The control system of claim 3, wherein assigning priority comprises:
determining that the CLOC valve is in a position indicative of zero exhaust flow to the CLOC, and wherein determining an engine out lambda comprises;
utilizing the signal solely from the second oxygen sensor.

6. The control system of claim 3, wherein assigning priority comprises:
determining that the CLOC valve is in a position indicative of a blend of exhaust flow between both the CLOC and the turbocharger, and wherein determining an engine out lambda comprises;
utilizing both the signals from the first and second oxygen sensor.

7. The control system of claim 6, wherein utilizing both the signals comprises using blended signals proportional to an amount of exhaust flow diverted toward the CLOC.

8. A method for controlling an engine comprising a turbocharger, the method comprising:
commanding operation of a cold light off catalyst (CLOC) positioned in a bypass passage around a turbine of the turbocharger, the commanding including commanding a CLOC valve to a first position whereby exhaust flow is routed, at least partially, to the CLOC in a CLOC mode;
receiving first and second signals from a respective first and a second oxygen sensor indicative of an oxygen content, wherein the first oxygen sensor is disposed between the CLOC valve and the CLOC and the second oxygen sensor is disposed between the CLOC and a main catalyst;
determining a position of the CLOC valve;
assigning priority to one of the first and second signals based on the position of the CLOC valve;
determining an engine out lambda based on the first and second signals and the assigned priority; and commanding an engine parameter based on the determined engine out lambda.

9. The method of claim 8, wherein second oxygen sensor is disposed downstream of the turbine.

10. The method of claim 8, wherein commanding an engine parameter comprises:
   commanding a fuel amount delivered to the engine.

11. The method of claim 9, wherein assigning priority comprises:
   determining that the CLOC valve is in a position indicative of full exhaust flow to the CLOC, and wherein determining an engine out lambda comprises;
   utilizing the signal solely from the first oxygen sensor.

12. The method of claim 9, wherein assigning priority comprises:
   determining that the CLOC valve is in a position indicative of zero exhaust flow to the CLOC, and wherein determining an engine out lambda comprises;
   utilizing the signal solely from the second oxygen sensor.

13. The method of claim 9, wherein assigning priority comprises:
   determining that the CLOC valve is in a position indicative of a blend of exhaust flow between both the CLOC and the turbocharger, and wherein determining an engine out lambda comprises utilizing both the signals from the first and second oxygen sensor.

14. The method of claim 9, wherein utilizing both the signals comprises using blended signals proportional to an amount of exhaust flow diverted toward the CLOC.

* * * * *